United States Patent Office 3,104,952
Patented Sept. 24, 1963

3,104,952
PROCESS FOR RECOVERING ELEMENTAL PHOSPHORUS
Rufus G. Hartig, Oak Park, Jeffersonville, Ind., assignor to Hooker Chemical Corporation, Niagara Falls, N.Y., a corporation of New York
No Drawing. Filed Aug. 2, 1960, Ser. No. 46,905
10 Claims. (Cl. 23—293)

This invention relates to a process for recovering elemental phosphorus. More particularly, this invention relates to a process for winning phosphorus from sludge formed in the condenser of thermal phosphorus operations, such as electric furnace and blast furnace operations.

Numerous processes have been developed for the production of elemental phosphorus by the thermal reduction of phosphorus-bearing ores such as phosphate rock. In these processes a mixture of phosphate rock, a carbonaceous reducing agent, and a flux such as silica is heated in a suitable furnace to form a hot gaseous mixture including phosphorus vapor, phosphorus oxides, silicon tetrafluoride, hydrogen fluoride, carbon monoxide and entrained solid particles from the furnace charge. Solid furnace residue, comprised of calcium silicate slag and ferrophosphorus, is discharged from the bottom of the furnace. The gaseous mixture is passed through an electrostatic precipitator, or otherwise treated, to remove a large portion of the solid particles entrained therein. The gaseous mixture discharged from the electrostatic precipitator is then passed into a condenser where the gaseous mixture is intimately contacted with water or an aqueous solution of an alkaline compound such as ammonia, alkali metal hydroxide or alkali metal carbonate. Elemental phosphorus, fluorine compounds, and suspended solids are removed from the gaseous mixture in the condenser, and uncondensed gas, which predominates in carbon monoxide, is withdrawn from the condenser and used as a fuel or otherwise utilized.

Three separate layers are formed in the condenser: an upper layer comprised of the water or aqueous alkaline solution containing dissolved compounds of fluorine; an intermediate sludge layer comprised of water or aqueous alkaline solution containing phosphorus, solid particles of phosphate rock, fluorine compounds, silica, carbon, phosphorus compounds, and the like; and a lower layer comprised of elemental phosphorus in liquid form. The upper layer may be removed and recycled to the top of the condenser, or processed to recover fluorine compounds therefrom, after which additional alkaline compounds may be added if desired, and the aqueous solution can then be recycled to the condenser. The lower layer comprised of elemental phosphorus is collected and may be processed as desired to produce compounds of phosphorus. The intermediate sludge layer is normally discarded. Because of the highly corrosive nature of the sludge, a serious problem is encountered when attempts are made to dispose of it. In addition, a significant proportion of the phosphorus produced in the thermal reduction process is entrained in the sludge and is normally lost when the sludge is discarded.

It is an object of this invention to provide a method of recovering elemental phosphorus.

It is a further object of this invention to provide an improved method of recovering elemental phosphorus from sludge formed in the condenser water of thermal phosphorus processes.

A further object of this invention is to provide a method of eliminating a disposal problem in thermal phosphorus processes.

Still a further object of the invention is to provide a method of reducing the corrosive nature of sludge formed in condenser water of thermal phosphorus processes.

It has now been discovered that when the intermediate sludge layer formed in the condenser of thermal phosphorus processes, after separation from the aqueous layer and phosphorus layer, is admixed with phosphoric acid and then subjected to steam distillation, in a non-oxidizing atmosphere, substantially all of the elemental phosphorus entrained in the sludge is distilled therefrom, and can be recovered from the distillate.

More in detail, the phosphorus-containing sludge layer formed in condenser water of thermal phosphorus processes, or any other aqueous dispersion of elemental phosphorus and solid impurities, can be treated in accordance with the instance novel process to recover elemental phosphorus. The sludge normally contains between about ten and about ninety-eight percent by weight of phosphorus, between about one and about eighty percent by weight of water or aqueous alkaline solution, and between about one and about forty percent by weight of solid impurities. However, the proportions of these ingredients may be lesser or greater than the aforesaid proportions, depending upon the source of the sludge. For example, the sludge frequently contains between about ten and about eighty-five percent by weight of yellow phosphorus, between about ten and about eighty percent by weight of water, and between about five and about forty percent by weight of solid impurities. The solid impurities are generally comprised of phosphorus compounds such as finely divided phosphate rock particles, carbon coke, silica, fluorine compounds such as alkali metal silicofluorides, and calcium fluoride. The term "solid impurities" as used throughout the description and claims is intended to include one or more of these solid compounds.

The phosphorus sludge is admixed with phosphoric acid prior to or simultaneously with steam distillation. It is preferred to employ concentrated aqueous phosphoric acid having a phosphoric acid concentration between about seventy-five and about ninety-five percent by weight, such as the eighty-five percent phosphoric acid of commerce, but phosphoric acid of a higher or lower acid concentration can be employed if desired. Sufficient phosphoric acid is admixed with the phosphorus sludge to maintain the resulting slurry in a fluid state at the distillation temperatures obtained. For example, when eighty-five percent phosphoric acid is admixed with a sludge containing about fifty percent water, a weight ratio of phosphoric acid to sludge of at least about 0.25:1. A phosphoric acid to sludge weight ratio of between about 0.5:1 and about 2:1 is preferably employed. Greater proportions of phosphoric acid may be employed if desired. Phosphoric acid not only aids in maintaining the slurry in a fluid state, but also is necessary in order to maintain the slurry at a relatively high temperature, thereby permitting a more rapid and more complete separation of phosphorus from the slurry than can be obtained when no phosphoric acid is used.

The slurry of phosphoric acid and phosphorus sludge is then subjected to steam distillation. Any suitable container provided with an inlet means for the slurry, an inlet means for conveying steam beneath the slurry level, and an outlet means for discharging the gaseous phosphorus-containing distillation product can be employed as the distillation container. The outlet means communicates with at least one condenser for condensing the gaseous phosphorus-bearing distillation product.

Various modifications of the distillation apparatus may be employed. For example, a mechanical agitator for agitating the slurry may be employed, but normally agitation sufficient to maintain the slurry in a homogeneous condition is provided by bubbling steam through the slurry during distillation. If desired, a supplementary means for heating the slurry may be provided, such as electric immersion heaters or external heating means. In addition, the distillation container may be provided with an inlet means for an inert gas such as nitrogen or carbon dioxide to assist in maintaining a non-oxidizing atmosphere in the distillation container, but the steam atmosphere produced during steam distillation is normally adequate to prevent oxidation of the elemental phosphorus at the temperature conditions employed.

Steam distillation of the slurry can be effected at atmospheric, sub-atmospheric or super-atmospheric pressure, the pressure conditions depending largely on the characteristics of the steam employed. The pressure in the distillation system should be slightly less than the pressure of the steam employed. Steam having a pressure of about one hundred p.s.i. at a temperature of about two hundred and sixty degrees centigrade is preferably employed, but steam having a pressure as high as six hundred p.s.i. and a temperature as high as three hundred and fifteen degrees centrigrade may be employed if desired.

The slurry temperature necessary to effect distillation of the phosphorus varies with pressure conditions employed. When the pressure in the distillation container is at or near atmospheric pressure, distillation of phosphorus generally begins at pot temperature of about fifty degrees centigrade, and the phosphorus distillation is substantially complete when the pot temperature increases to about two hundred and sixty degrees centigrade. Slurry temperature is preferably maintained between about one hundred and about three hundred and fifty degrees centigrade, but any temperature consistent with economic operation can be employed.

The phosphorus-bearing gases produced by steam distillation are conveyed to the condenser where two liquid layers are formed, the lower layer being comprised of elemental phosphorus and the upper layer being comprised of water containing a small proportion of phosphoric acid. The layers are separated, and the elemental phosphorus is collected. The aqueous phosphoric acid may be used to prepare dicalcium phosphate, alkali metal phosphates, and phosphate-containing agricultural products.

During distillation the solid phosphate rock particles suspended in the slurry are reacted with the phosphoric acid to form monocalcium phosphate. After completion of the distillation, the pot residue, which is predominately phosphoric acid containing monocalcium phosphate in solution, may be filtered or otherwise treated to remove any suspended solids present, and the clarified phosphoric acid may then be recycled for admixing with additional phosphorus containing sludge. If desired, the solution of phosphoric acid and monocalcium phosphate may be utilized in the preparation of phosphate-containing fertilizers, animal feeds and the like.

It will be recognized by those skilled in the art that the novel process can be carried out as either a batch process or a continuous process.

Although the mixture of sludge and phosphoric acid is highly corrosive to the usual materials of construction, the process can be readily carried out on a commercial scale when the distillation apparatus is constructed of suitable corrosion resisting materials, such as steel lined with carbon brick.

The following examples are presented to define the invention more fully without any intention of being limited thereby. All parts and percentages are by weight unless otherwise specified.

*Examples 1–5*

An aqueous sludge produced in the condenser of a commercial thermal phosphorus process, containing about thirty-five percent yellow phosphorus, about fifty-five percent water, and about ten percent of solid impurities comprised of phosphate rock particles, carbon coke and silica was divided into five portions designated as portions A, B, C, D, and E, respectively. Each portion was admixed with concentrated phosphoric acid (eighty-seven percent) and subjected to steam distillation in accordance with the technique of the instant novel process.

The distillation apparatus was comprised of a three-neck, two-liter distilling flask, equipped with a nitrogen purge connection, a thermometer extending to the bottom of the flask, and a steam sparging tube connected to a one hundred degree centigrade steam supply, extending to the bottom of the flask. The flask was heated by an electric mantle and was insulated. The vapors passed through an insulated tube into two water condensers in series, the condensers being cooled by a water bath.

In each example, the acid was added to the flask, nitrogen was then added to purge the system of air, and the sludge was then added to the acid in the flask. Heating of the flask was started, and the nitrogen purge continued at a minimum rate until the distillation temperature was reached.

In Examples 3 and 4, no steam was added until the temperature of the slurry was between one hundred and fifty-five to one hundred and seventy degrees centigrade. In Examples 1, 2 and 5, steam was introduced during the heating period. Distillation was continued until no phosphorus appeared in the condensing tube. At the end of each test, the system was purged with nitrogen, a sample of the flask residue was withdrawn for analyses, the phosphorus collected in the traps was weighed, and the condensate was analyzed.

The proportions of ingredients, the distillation conditions, and analyses of the products are set forth below in the table.

| Example | 1 | 2 | 3 | 4 | 5 |
|---|---|---|---|---|---|
| Portion | A | B | C | D | E |
| Gms. Sludge | 51 | 54 | 50 | 47 | 51 |
| Gms. 87 percent $H_3PO_4$ | 100 | 100 | 100 | 100 | 100 |
| Temp. dist. begun, °C | 130 | 130 | 130 | 140 | 130 |
| Peak Temp. reached, °C | 210 | 190 | 260 | 216 | 260 |
| Total time of distillation, min | 25 | 60 | 10 | 25 | 10 |
| Residual acid concentration, percent $H_3PO_4$ | 91.5 | 89.0 | 95.6 | 92.8 | 98.8 |
| Phosphorus in residual acid, percent | | 2.8 | 2.5 | 2.2 | 2.1 |
| Gms. phosphorus in residue, estimated | | 2 | 1.5 | 2 | 1 |
| Vol. water in condensers, ml. at start | 700 | 700 | 700 | 700 | 700 |
| Vol. water plus condensate, ml | 820 | 900 | 840 | 950 | 950 |
| Vol. condensate, ml | 120 | 200 | 140 | 250 | 250 |
| Acid in water plus condensate, percent $H_3PO_4$ | 1.7 | 3.3 | 3.0 | 2.4 | 4.1 |
| Acid in condensate only, percent $H_3PO_4$ | 6.8 | 7.4 | 18.0 | 9.1 | 15.6 |
| Equiv. gms. 87 percent acid in condensate | 9.3 | 17.0 | 29.0 | 26.2 | 44.9 |
| Gms. $P_4$ distilled | 17 | 16 | 14 | 20 | 15 |
| Gms. $P_4$ distilled/gm. sludge | 0.33 | 0.30 | 0.28 | 0.43 | 0.29 |
| Gms. condensate/gm. $P_4$ distilled | 7.1 | 12.5 | 10.0 | 12.5 | 16.7 |

Phosphorus recovered in each example was of excellent quality and yields were in excess of about ninety percent in each case.

It will be recognized by those skilled in the art that various modifications within the invention are possible, some of which are referred to above. Therefore, I do not wish to be limited except as defined by the appended claims.

I claim:
1. The process for recovering elemental phosphorus from a sludge comprised of elemental phosphorus, water and solid impurities, which comprises admixing said sludge with concentrated aqueous phosphoric acid, subjecting the resulting slurry to steam distillation in inert atmosphere free from oxidizing conditions, whereby a gaseous product comprising steam and elemental phosphorus is produced, condensing said gaseous product, and separating elemental phophorus from the resulting condensate.

2. The process for recovering elemental phosphorus from a sludge containing between about ten and about ninety-eight percent by weight of elemental phosphorus, between about one and about eighty percent by weight of water, and between about one and about forty percent by weight of solid impurities, which comprises admixing said sludge with concentrated aqueous phosphoric acid, subjecting the resulting slurry to steam distillation in inert atmosphere free from oxidizing conditions, whereby a gaseous product comprising steam and elemental phosphorus is produced, condensing said gaseous product, and separating elemental phosphorus from the resulting condensate.

3. The process of claim 2 wherein the concentration of said phosphoric acid is between about seventy-five and about ninety-five percent phosphoric acid by weight, and wherein the weight ratio of said phosphoric acid to said sludge is between about 0.5:1 and about 2:1.

4. The process for recovering elemental phosphorus from a sludge, under atmospheric pressure, which sludge is comprised of elemental phosphorus, water, and solid impurities which comprises admixing said sludge with concentrated aqueous phosphoric acid, subjecting the resulting slurry to steam distillation at a slurry temperature of between about one hundred and about three hundred and fifty degrees centigrade, whereby a gaseous product comprising steam and elemental phosphorus is produced, condensing said gaseous product, and separating elemental phosphorus from the resulting condensate.

5. The process for recovering elemental phosphorus from a sludge, under atmospheric pressure, which sludge is comprised of between about ten and about ninety-eight percent by weight of elemental phosphorus, between about one and about eighty percent by weight of water, and between about one and about forty percent by weight of solid impurities, which comprises admixing said sludge with concentrated aqueous phosphoric acid, said phosphoric acid having a concentration of between about seventy-five and about ninety-five percent by weight, the weight ratio of said phosphoric acid to said sludge being between about 0.25:1 and about 2:1, subjecting the resulting slurry to steam distillation at a temperature between about one hundred and about three hundred and fifty degrees centigrade in inert atmosphere free from oxidizing conditions, whereby a gaseous product comprising steam and elemental phosphorus is produced, condensing said gaseous product, and separating elemental phosphorus from the resulting condensate.

6. The process of claim 5 wherein said steam distillation is carried out in an atmosphere of inert gas selected from the group consisting of nitrogen and carbon dioxide.

7. The process for recovering elemental phosphorus from a sludge comprised of elemental phosphorus, water and solid impurities, which comprises admixing said sludge with concentrated aqueous phosphoric acid, subjecting the resulting slurry to steam distillation in inert atmosphere free from oxidizing conditions, whereby a gaseous product comprising steam and elemental phosphorus, and a liquid residue comprised of aqueous phosphoric acid containing suspended solid impurities are produced, condensing said gaseous product, separating elemental phosphorus from the resulting condensate, separating suspended solids from said distillation residue, and admixing the resulting clarified distillation residue with another portion of said sludge.

8. The process for recovering elemental phosphorus which comprises thermally reducing a phosphorus-containing ore and thereby producing a phosphorus vapor stream, condensing said phosphorus vapor stream by spraying with water in inert atmosphere free from oxidizing conditions, collecting the resulting condensate and permitting it to separate into an intimate three-phase system comprised of an upper layer of water, an intermediate sludge layer comprised of elemental phosphorus, water and solid impurities, and a lower layer comprised of elemental phosphorus, separating said intermediate sludge layer from said three-phase system, admixing said sludge with concentrated aqueous phosphoric acid, subjecting the resulting slurry to steam distillation in inert atmosphere free from oxidizing conditions whereby a gaseous product comprising steam and elemental phosphorus, and a liquid distillation residue comprising phosphoric acid and solid impurities are produced, condensing said gaseous product, and separating elemental phosphorus from the resulting condensate and collecting elemental phosphorus from said lower layer.

9. The process of claim 8 wherein said solid impurities are separated from said liquid distillation residue, and the resulting clarified distillation residue is admixed with another portion of said sludge.

10. The process of recovering elemental phosphorus from an aqueous sludge containing elemental phosphorus which comprises admixing said sludge with phosphoric acid, then subjecting said admixture to steam distillation in an inert atmosphere free from oxidizing conditions, to produce a gaseous product containing elemental phosphorus, condensing said gaseous product, and separating elemental phosphorus from the resulting condensate.

References Cited in the file of this patent
UNITED STATES PATENTS

| | | |
|---|---|---|
| 1,951,984 | Kerschbaum et al. | Mar. 20, 1934 |
| 2,039,297 | Curtis | May 5, 1936 |
| 2,135,486 | Almond | Nov. 8, 1938 |
| 3,004,834 | Harnisch et al. | Oct. 17, 1961 |